United States Patent
Rees

(10) Patent No.: US 7,165,031 B2
(45) Date of Patent: Jan. 16, 2007

(54) SPEECH PROCESSING APPARATUS AND METHOD USING CONFIDENCE SCORES

(75) Inventor: David Llewellyn Rees, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/288,287

(22) Filed: Nov. 6, 2002

(65) Prior Publication Data
US 2003/0154078 A1    Aug. 14, 2003

(30) Foreign Application Priority Data
Feb. 14, 2002    (GB) ................................. 0203565.7

(51) Int. Cl.
*G10L 15/00*    (2006.01)
(52) U.S. Cl. .................... 704/252; 704/239; 704/240
(58) Field of Classification Search ............... 704/252, 704/239, 240
See application file for complete search history.

(56) References Cited

U.S. PATENT DOCUMENTS

| | | | |
|---|---|---|---|
| 5,559,925 A | 9/1996 | Austin ...................... 395/2.4 |
| 5,613,037 A | 3/1997 | Sukkar ..................... 395/2.65 |
| 5,710,864 A | 1/1998 | Juang et al. ............... 395/2.47 |
| 5,737,489 A | 4/1998 | Chou et al. ............... 395/2.65 |
| 5,842,163 A | 11/1998 | Weintraub ................. 704/240 |
| 6,535,850 B1 * | 3/2003 | Bayya ....................... 704/269 |
| 6,804,647 B1 * | 10/2004 | Heck et al. ................ 704/246 |
| 2003/0130844 A1 * | 7/2003 | Chaudhari et al. ......... 704/240 |

* cited by examiner

*Primary Examiner*—David Hudspeth
*Assistant Examiner*—Jakieda R. Jackson
(74) *Attorney, Agent, or Firm*—Fitzpatrick, Cella, Harper & Scinto

(57) ABSTRACT

A speech recognition method and apparatus is disclosed in which outputs a confidence score indicative of the posterior probability of an utterance being correctly matched to a word model. The confidence score for the matching of an utterance to a word model is determined directly from the generated values indicative of the goodness of match between the utterance and stored word models utilizing the following equation:

$$\text{confidence} = \frac{\exp\left(-\frac{\sqrt{2}}{\sigma}S(x|w)\right)}{\sum_{words}\exp\left(\frac{\sqrt{2}}{\sigma}S(x|w)\right)}$$

where S(x|w) is the match score for the correlation between a signal x and word w and σ is an experimentally determined constant.

17 Claims, 5 Drawing Sheets

SPEECH PROCESSING APPARATUS AND METHOD USING CONFIDENCE SCORES

BACKGROUND OF THE INVENTION

1. Field of the Invention

The present invention relates to a speech processing apparatus and method. In particular, embodiments of the present invention are applicable to speech recognition.

2. Description of Related Art

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (>10,000 words) while others only operate with a limited sized vocabulary (<1000 words). Some systems can only recognise isolated words whereas others can recognise phrases comprising a series of connected words.

In a limited vocabulary system, speech recognition is performed by comparing features of an unknown utterance with features of known words which are stored in a database. The features of the known words are determined during a training session in which one or more samples of the known words are used to generate reference patterns therefor. The reference patterns may be acoustic templates of the modelled speech or statistical models, such as Hidden Markov Models.

To recognise the unknown utterance, the speech recognition apparatus extracts a pattern (or features) from the utterance and compares it against each reference pattern stored in the database. A scoring technique is used to provide a measure of how well each reference pattern, or each combination of reference patterns, matches the pattern extracted from the input utterance. The unknown utterance is then recognised as the word(s) associated with the reference pattern(s) which most closely match the unknown utterance.

In limited vocabulary speech recognition systems, any detected utterance is usually matched to the closest corresponding word model within the system. A problem with such systems arises because out-of-vocabulary words and environmental noise can be accidentally matched to a word within the system's vocabulary.

One method of detecting accidental matches used by prior art systems is to provide a language model which enables the likelihood that detected words would follow each other to be determined. Where words are detected that are unlikely to follow each other, the language model can then identify that at least one of the detected words will probably have been incorrectly identified.

An alternative method of detecting accidental recognition is to generate a measure of how well a detected utterance matches the closest word model as is disclosed in for example U.S. Pat. No. 5559925, U.S. Pat. No. 5613037, U.S. Pat. No. 5710864, U.S. Pat. No. 5737489 and U.S. Pat. No. 5842163. This measure or confidence score is then used to help the system recognise accidental matches. However, the correlation between generated confidence scores in the prior art and the likelihood that an utterance has been mismatched can be unsatisfactory.

There is therefore a need for apparatus and method which can generate a better measure of the likelihood that an utterance has been mismatched. Furthermore, there is a need for a speech recognition system in which a generated score that the likelihood that an utterance has been mismatched can be combined with other means of detecting mismatched utterances such as that provided by language models so that the reliability of speech recognition systems can be improved.

SUMMARY OF THE INVENTION

In accordance with one aspect of the present invention there is provided a speech recognition apparatus for matching detected utterances to words comprising:
  detection means for detecting and determining a plurality of features of a detected utterance to be matched; and
  matching means for determining which of a plurality of stored acoustic models most closely matches said features of a detected utterance, said matching means being arranged to output a plurality of match scores indicative of the correspondence of the features of the utterance and features of said stored acoustic models;
  characterised by:
  conversion means for outputting as a confidence score indicative of the probability an utterance has been correctly matched to an acoustic model wherein said confidence score is calculated by determining the ratio of a function of the match score for said model relative to the sum of said function of the match scores for said plurality of models, wherein said function comprises a determined exponential of a constant multiplied by said match score for a model.

BRIEF DESCRIPTION OF THE DRAWINGS

An exemplary embodiment of the invention will now be described with reference to the accompanying drawings in which.

DETAILED DESCRIPTION OF THE PREFERRED EMBODIMENTS

Embodiments of the present invention can be implemented in computer hardware, but the embodiment to be described is implemented in software which is run in conjunction with processing hardware such as a personal computer, workstation, photocopier, facsimile machine, personal digital assistant (PD) or the like.

Figure 1:
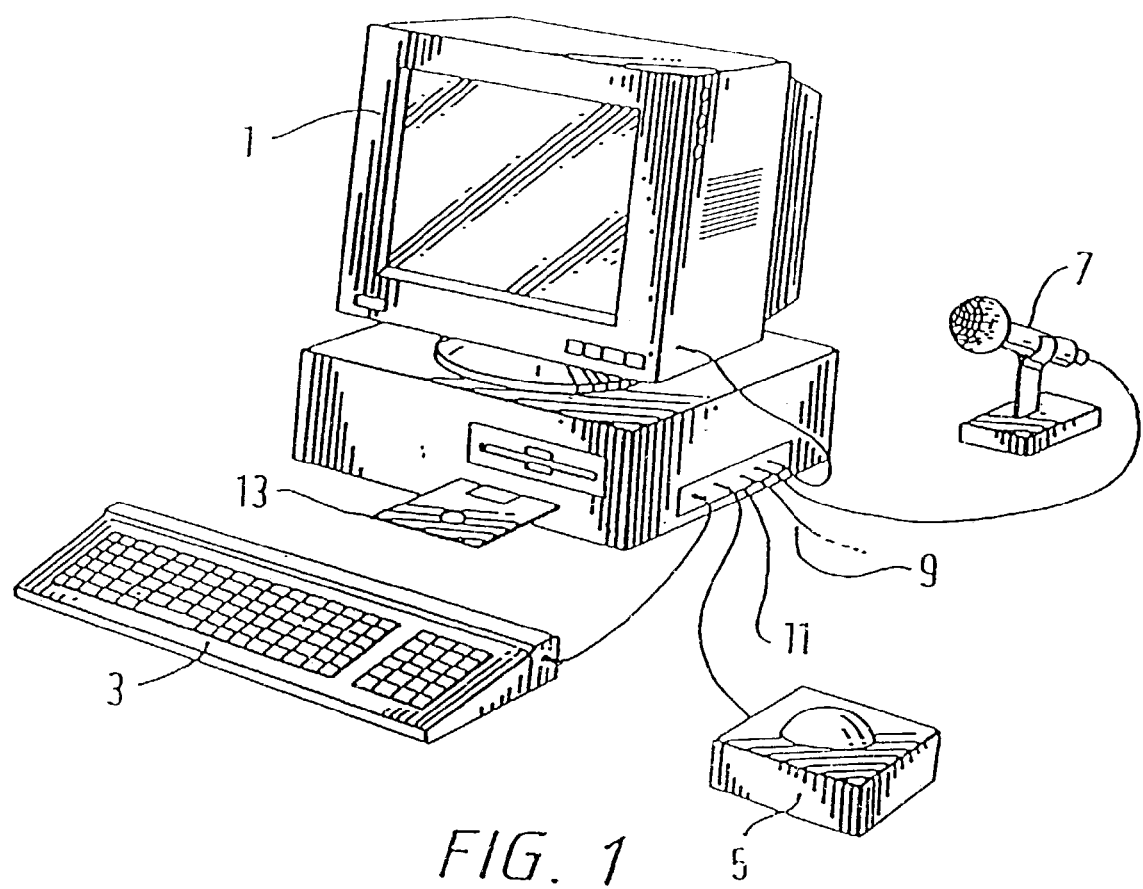
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with an existing PC 1 on, for example a storage device such as a magnetic disc 13, or by downloading the software from the Internet (not shown) via the internal modem and the telephone line 9.

Figure 2:
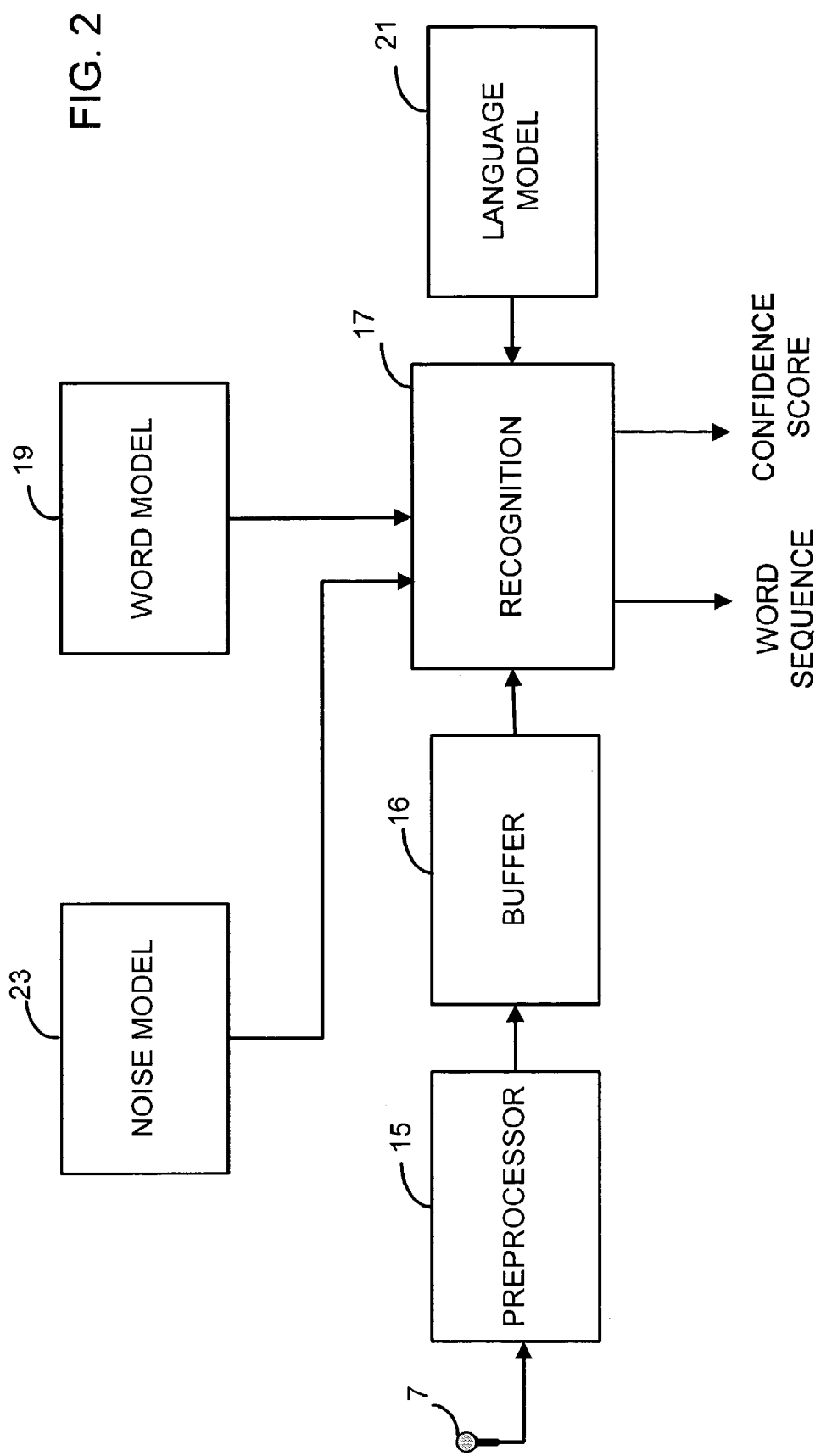
FIG. 2 is a schematic overview of a speech recognition system in accordance with an embodiment of the present invention.

The operation of the speech recognition system of this embodiment will now be briefly described with reference to FIG. 2. A more detailed description of the speech recognition system can be found in the Applicant's earlier European patent application EP 0789349, the content of which is hereby incorporated by reference.

Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied, via buffer 16, to a recognition block 17 where the speech is recognised by comparing the input sequence of parameter frames with reference models or word models stored in a word model block 19, each model comprising a sequence of parameter frames expressed in the same kind of parameters as those of the input speech to be recognised.

A language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system.

The word sequence output from the recognition block 17 may then be transcribed for use in, for example, a word processing package or can be used as operator commands to initiate, stop or modify the action of the PC 1.

In accordance with the present invention, as part of the processing of the recognition block 17 the words of the output word sequence are each associated with a confidence score indicative of the likelihood of recognised words having been correctly recognised. Specifically, the recognition block 17 determines for each of the word models in the word model block 19 the extent of correlation between features of detected utterance and corresponding features of stored word models. The best match is identified and a confidence score is then calculated utilizing the extent of correlation as will be described in detail later. This confidence score is then utilised by the PC 1 to determine whether the matching of received speech input to words is sufficiently accurate to either act on the received input, to ask for user confirmation of the data, to ignore the received input or to request re-entry of the data.

A more detailed explanation will now be given of some of the apparatus blocks described above.

Preprocessor

The preprocessor will now be described with reference to FIG. 3.

The functions of the preprocessor 15 are to extract the information required from the speech and to reduce the amount of data that has to be processed. There are many different types of information which can be extracted from the input signal. In this embodiment the preprocessor 15 is designed to extract "formant" related information. Formants are defined as being the resonant frequencies of the vocal tract of the user, which change as the shape of the vocal tract changes.

Figure 3:
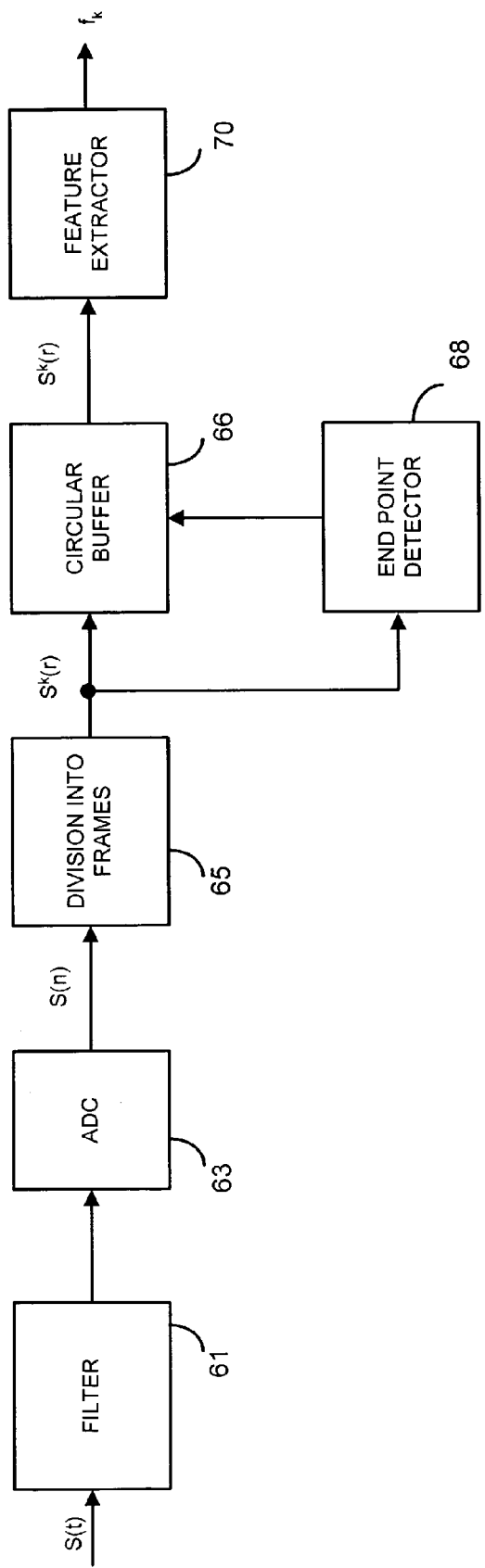
FIG. 3 is a block diagram of the preprocessor incorporated as part of the system shown in FIG. 2, which illustrates some of the processing steps that are performed on the input speech signal.

FIG. 3 shows a block diagram of some of the preprocessing that is performed on the input speech signal. Input speech S(t) from the microphone 7 or the telephone line 9 is supplied to filter block 61, which removes frequencies within the input speech signal that contain little meaningful information. Most of the information useful for speech recognition is contained in the frequency band between 300 Hz and 4 KHz. Therefore, filter block 61 removes all frequencies outside this frequency band. Since no information which is useful for speech recognition is filtered out by the filter block 61, there is no loss of recognition performance. Further, in some environments, for example in a motor vehicle, most of the background noise is below 300 Hz and the filter block 61 can result in an effective increase in signal-to-noise ratio of approximately 10 dB or more. The filtered speech signal is then converted into 16 bit digital samples by the analogue-to-digital converter (ADC) 63. To adhere to the Nyquist sampling criterion, the ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into non-overlapping equal length frames in block 65. The speech frames $S^k(r)$ output by the block 65 are then written into a circular buffer 66 which can store 62 frames corresponding to approximately one second of speech. The frames written in the circular buffer 66 are also passed to an endpoint detector 68 which process the frames to identify when the speech in the input signal begins, and after it has begun, when it ends. Until speech is detected within the input signal, the frames in the circular buffer are not fed to the computationally intensive feature extractor 70. However, when the endpoint detector 68 detects the beginning of speech within the input signal, it signals the circular buffer to start passing the frames received after the start of speech point to the feature extractor 70 which then extracts a set of parameters $f_k$ for each frame representative of the speech signal within the frame. The parameters $f_k$ are then stored in the buffer 16 (not shown in FIG. 3) prior to processing by the recognition block 17 (as will now be described).

Recognition Block and Word Model Block

Figure 4:
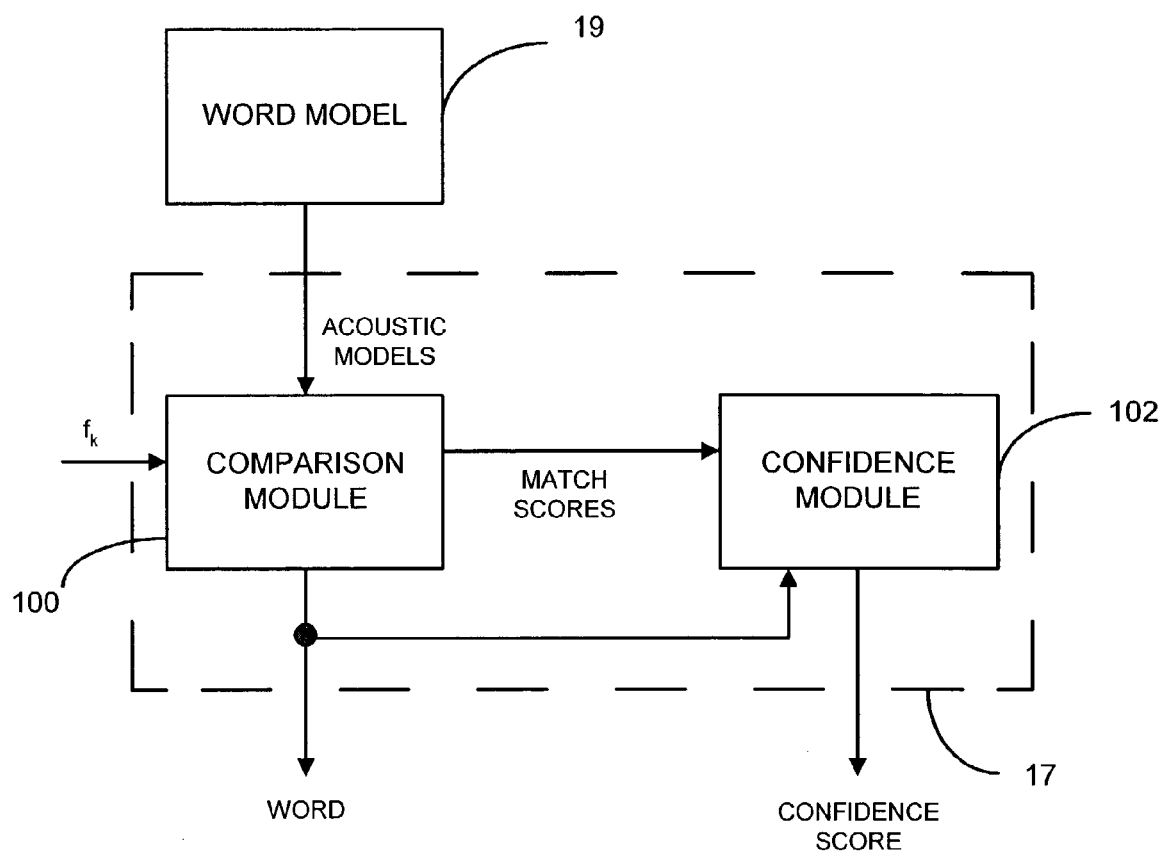
FIG. 4 is a block diagram of the word model block and recognition block incorporated as part of the system shown in FIG. 2.

FIG. 4 is a schematic block diagram of a recognition block 17 and word model block 19 in accordance with the present invention.

In this embodiment, the recognition block 17 comprises a comparison module 100 arranged to receive sets of parameters $f_k$ from the buffer 16 (not shown in FIG. 4) to determine feature match scores indicative of the extent the parameters $f_k$ match corresponding features of stored models; and a confidence module 102 arranged to receive match scores from the comparison module 100 and output a confidence score for matches of utterances to word models.

Figure 5:
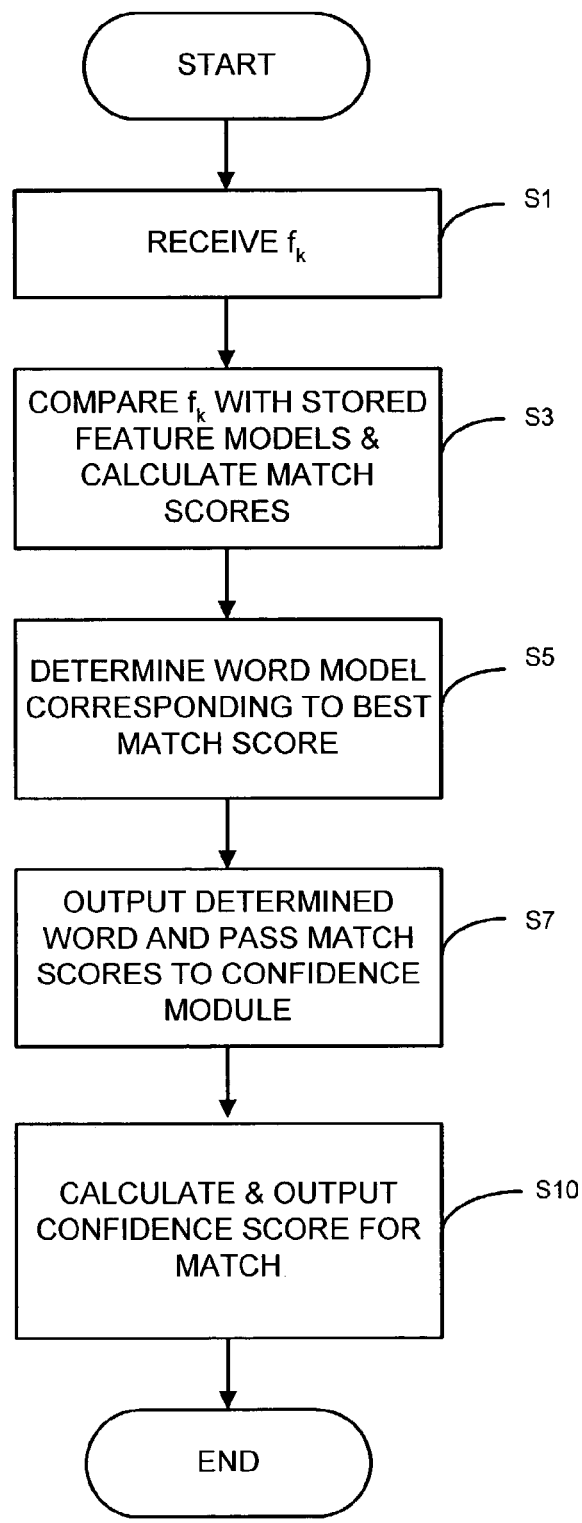
FIG. 5 is a flow diagram of the processing of the recognition block in matching an utterance with a feature model and generating a confidence score.

An overview of the processing of the recognition block 17 matching an utterance with a feature model and generating a confidence score will now be described with reference to FIG. 5 which is a flow diagram of the processing of the recognition block 17.

Initially (S1) the comparison module 100 receives a set of parameter frames $f_k$ from the buffer 16. When a set of parameter frames $f_k$ have been received by the comparison module 100, the comparison module 100 then (S3) compares the received parameter frames with the parameter vectors of the stored word models 19. For each of the word models, the comparison module 100 then calculates a match score for the word model and the received parameter frames $f_k$ received from the buffer 16 in a conventional manner.

In this embodiment the calculated match scores comprise calculated Euclidian distances between the feature parameters $f_k$ received from the buffer 16 and model representations of feature parameters of words in the word model block 19. These calculated match scores are then stored within the comparison module 100 together with word numbers for the word models from the word model block 19 used to determine the match scores.

After the comparison module 100 has calculated and stored match scores for all of the word models stored within the word model block 19, the comparison module 100 then (S5) determines which of the word models is associated with the best match score, and therefore which word model most closely matches the sequence of parameter vectors $f_k$ received from the buffer 16.

When the best match for the received sequence of parameter vectors $f_k$ has been determined, the comparison module 100 then (S7) outputs as a match for the utterance the word number for the word model which resulted in the best match. The comparison module 100 also passes this word number together with the match scores for all of the words to the confidence module 102.

When the confidence module 102 receives the word number for the best match and the match scores for all of the word models, the confidence module 102 then (S10) calculates and outputs a confidence score for the matching of the utterance to the word model identified by the output word number as will now be described in detail.

In accordance with this embodiment of the present invention, a confidence score is calculated only on the basis of the received match scores. The main advantage of this approach is that no additional confidence models are required. Further, as the confidence score is based on scores used during recognition, the calculated confidence score tends to be a fairly robust estimate of the recognition performance of the system. This arises because, for example, noise tends to reduce the likelihood of the correct vocabulary word being identified and also affects the match values which are generated. By basing a confidence score solely upon the match scores, the confidence score may be made to reflect this effect and hence identify a lower recognition confidence when utterances are captured in a noisy environment.

A confidence score equal to the posterior probability of the recognition result being correct (p(w|x)) can be formulated using Bayes theorem as being equal to:

$$p(w|x) = \frac{p(x|w)p(w)}{p(x)} \qquad (1)$$

where p(x|w) is the likelihood of observing the signal x assuming the word w was spoken, p(x) is the probability of observing signal x and p(w) is the prior probability that the word w will be spoken.

Assuming only in vocabulary words are spoken and that all words in the vocabulary are equally likely to be spoken so that the p(w) is a constant Equation 1 may then be re-written as follows:

$$p(w|x) = \frac{p(x|w)}{\sum_w p(x|w)} \qquad (2)$$

where p(x|w) is the likelihood for observing the signal x assuming w was the word spoken and $\Sigma_w p(x|w)$ is the sum of p(x|w) over all words in the vocabulary.

The applicants have appreciated that although match scores calculated during recognition do not directly correspond to likelihood values, these match scores can be converted into estimates of the likelihood of observing the signal x assuming that a word w was spoken. This can be achieved by assuming that the template acoustic models represent a sequence of states each having an associated probability density function.

Based on such an assumption the posterior probability of a recognition result being correct p(x|w) is then:

$$p(x|w) = f_1(x_1)f_2(x_2)\ldots f_t(x_t) \qquad (3)$$

where $f_i(x_i)$ is a function linking the parameter vector $x_i$ for the frame associated with time i with a probability function associated with the acoustic template for the portion of the word corresponding to that part of the utterance.

If it is then assumed that these functions are independent and that they can each be described by a Laplacian probability density function of the form:

$$f_i(x_i) = \prod_i \frac{1}{\sqrt{2\sigma_{ij}}} \exp\left(-\frac{\sqrt{2}}{\sigma_{ij}}|x_{ij} - \mu_{ij}|\right) \qquad (4)$$

where $x_{ij}$ is the jth component of the parameter vector $x_i$ and $\mu_{ij}$ and $\sigma_{ij}$ are the mean and sigma parameters for the jth component of the Laplacian probability function for the ith state representing a portion of the word w, substituting Equation 4 in Equation 3 and taking natural logarithms the total log likelihood L for a sequence of n frames is then given by:

$$L = -\sum_{i=1}^{N}\sum_{j} \ln \sigma_{ij} - \sum_{i=j}^{N}\sum_{j} \frac{\sqrt{2}}{\sigma_{ij}}|x_{ij} - \mu_{ij}| \qquad (5)$$

If it is then assumed that the sigma parameters of the Laplacian probability density functions of the template acoustic models are equal the first term of Equation 5 is a constant. The second term is then $\sqrt{2}/\sigma$ multiplied by the Euclidian distance between a series of feature parameters and the acoustic model represented by the series of means of states representing a word. In other words a constant multiplied by the match score for a model. Thus ignoring the first constant term the likelihood of signal x being received given that word w has been spoken may be determined from the match score for the word utilizing the following equation:

$$p(x|w) \cong \exp\left(-\frac{\sqrt{2}}{\sigma}S(x|w)\right) \qquad (6)$$

where S(x|w) is the match score for word w.

Hence it is possible to rewrite Equation 2 in terms of match scores with:

$$p(w|x) = \frac{\exp\left(-\frac{\sqrt{2}}{\sigma}S(x|w)\right)}{\sum_w \exp\left(-\frac{\sqrt{2}}{\sigma}S(x|w)\right)} \qquad (7)$$

Thus by the confidence module 102 calculating a confidence score directly from the match scores using Equation 7 above, the posterior probability of the word identified by the output word number can be simply estimated. The output confidence score can then be utilized by the rest of the speech recognition system to determine whether the matched speech is sufficiently accurate to act upon.

In setting up the confidence module 102, a suitable value for sigma can be found experimentally by adjusting an estimated value until the confidence score predicts the observed recognition accuracy in tests.

Specifically, whether or not the confidence score is accurate can be determined by calculating whether for a selected value of σ:

$$\frac{\sum_{conf}(w_i) - \text{correct}(w)}{\text{matched}(w)} \leq \varepsilon \qquad (8)$$

where Σconf(w$_i$) is the sum of the confidence scores for all utterances matched to feature model w, correct (w) is the total number of utterances in the test vocabulary correctly matched to feature model w and matched (w) is the total number of utterances in the test vocabulary matched to feature model w and epsilon is an acceptable margin of error, for example, 0.05.

Alternative Embodiments

A number of modifications can be made to the above speech recognition system without departing from the inventive concept of the present invention. A number of these modifications will now be described.

Although calculating the above confidence score utilizing the equation detailed above mathematically represents a time posterior probability only when the assumptions detailed above hold true, it has been determined that the confidence scores output by processing match scores in the above described manner are surprisingly accurate for many different types of speech models. It is therefore believed that any errors arising from assuming that the probability density functions for word models are of the above types are small relative to other errors in the system and hence confidence scores calculated in this manner are widely applicable.

It will be appreciated that in a speech recognition system where match scores are not available for all in vocabulary words because the speech recognition system prunes words that have a poor score, Equation 7 may be approximated by calculating the sum in the dominator only for words for which acoustic scores have been calculated. As poorly matching words will have a small likelihood, these do not contribute significantly to the sum in the denominator and therefore the approximation has only a limited impact on the accuracy of the confidence score.

In the above embodiment, a posterior probability is calculated assuming only in vocabulary words are spoken. In addition to in vocabulary words a speech recognition system might detect noises or out of vocabulary words. If this is the case a confidence score representing the posterior probability becomes:

$$p(w|x) = \frac{p(x|w)p(w)}{\left(\sum_w p(x|w)p(w) + p(x|oov)p(oov) + P(x|\text{noise})p(\text{noise})\right)} \qquad (9)$$

where p(x|oov) and p(oov) are the model likelihood and prior probability for out of vocabulary words being detected and p(x|noise) and p(noise) are the model likelihood and prior probability of noise being detected. Where the probability of noise or out of vocabulary words being detected is low the additional terms in Equation 9 may be ignored and hence the confidence score described in the embodiment may be validly used. If, however, the probabilities of detecting noise or out of vocabulary words is high, these additional terms may be included in calculating a confidence score described in the embodiment. In calculating values for the model likelihoods and probabilities of detecting out of vocabulary words and noise either constant values may be used or these probabilities and likelihoods may be modelled in detail using conventional techniques.

In the above described embodiment a language model is described which restricts the number of possible words which can be matched to an utterance on the basis of the previously detected utterances. It will be appreciated that instead of a language model restricting the possible matches for utterances, a language model could be provided which utilised output confidence scores together with a model of the probability of words following each other within a word sequence to determined a confidence score for words within a detected word sequence.

More generally it will be appreciated that since the confidence score in accordance with the present invention is a value indicative of the posterior probability of the recognition of a word being correct given that a particular utterance resulted in the generation of particular values by the recognition block 17, a generated confidence score can be combined with any other value indicative of a word or sequence of words being correct based upon other available information to generate an improved confidence score which accounts for the other available information in addition to the data utilised by the recognition block 17.

Although a continuous word speech recognition system is described in the first embodiment described above, it will be apparent to those skilled in the art that the system described above could equally apply to other kinds of speech recognition systems.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A speech recognition apparatus operable to determine a confidence score indicative of the probability that an utterance has been correctly matched to a word, said apparatus comprising:
   a receiver operable to receive a signal indicative of an utterance;
   a matching unit operable to determine, for each of a plurality of word models, a match value indicative of the closeness of match of each said word model to a said signal received by said receiver;
   a calculation unit operable to calculate an exponential of a constant multiplied by a match value determined by said matching unit for an estimate of the likelihood of the signal matching a word model given that said signal is indicative of an utterance corresponding to a word represented by said word model; and
   a processing unit operable to process estimates generated by said calculation unit to determine a confidence score indicative of the probability that an utterance has been correctly matched to a word by calculating a fraction, the numerator of which comprises the estimate generated by said calculation unit from a match value for a word model for said word and the denominator of which comprises a sum of estimates generated by said calculation unit from match scores for a plurality of word models.

2. An apparatus in accordance with claim 1, wherein said denominator comprises the sum of estimates generated by said calculation unit from match values for all of said word models matched by said matching unit to a signal.

3. An apparatus in accordance with claim 1, wherein said denominator comprises the sum of estimates generated by said calculation unit from match values indicative of at least a predetermined closeness of match.

4. An apparatus in accordance with claim 1, wherein said denominator comprises the sum of estimates generated by said calculation unit from a predetermined number of selected match values, wherein said selected match values comprise values indicative of the closest matches between a said signal and said word models.

5. An apparatus in accordance with claim 1, wherein said denominator comprises said sum of estimates generated by said calculation unit and one or more additional values indicative of estimates of the likelihood of the signal matching a word model given that said signal is not indicative of a word represented by said word models.

6. An apparatus in accordance with claim 1, wherein said matching unit comprises:
   a model data store configured to store word models, said plurality of word models each comprising a set of values for a number of features of one or more utterances corresponding to a word;
   a feature extractor operable to extract from a signal received by said receiver a set of values for a number of features; and
   a comparator operable to determine as a match value for a received signal and a stored word model, a value indicative of the Euclidian distance between a said set of values extracted by said feature extractor and said set of values for said stored word model.

7. An apparatus in accordance with claim 6, wherein said model data store is configured to store word models indicative of a series of sets of features corresponding to a word and said feature extractor is operable to extract a comparable series of features from a signal received by said receiver.

8. An apparatus in accordance with claim 6, wherein said comparator is operable to calculate a logarithmic probability of a received signal corresponding to a word represented by a word model and output said probability as a match value for said word model.

9. A method of determining a confidence score indicative of the probability that an utterance has been correctly matched to a word, said method comprising the steps of:
   receiving a signal indicative of an utterance;
   determining, for each of a plurality of word models, a match value indicative of the closeness of match of each said word model to said received signal;
   for each of said match values, calculating an exponential of a constant multiplied by said match value as an estimate of the likelihood of the signal matching a word model given that said signal is indicative of an utterance corresponding to a word represented by said word model; and
   processing said estimates to determine a confidence score indicative of the probability that an utterance has been correctly matched to a word by calculating a fraction, the numerator of which comprises an estimate generated from a match value for a word model for said word and the denominator of which comprises a sum of generated estimates from match scores for a plurality of word models.

10. A method in accordance with claim 9, wherein said denominator comprises the sum of generated estimates for all of said word models matched to a signal.

11. A method in accordance with claim 9, wherein said denominator comprises the sum of generated estimates from match values indicative of a predetermined closeness of match.

12. A method in accordance with claim 9, wherein said denominator comprises the sum of generated estimates from a predetermined number of selected match values, wherein said selected match values comprise values indicative of the closest matches between a said signal and said word models.

13. A method in accordance with claim 9, wherein said denominator comprises said sum of said generated estimates and one or more additional values indicative of estimates of the likelihood of the signal matching a word model given that said signal is not indicative of a word represented by said word models.

14. A recording medium storing computer implementable processor steps for causing a programmable computer to perform a method in accordance with claim 9.

15. A recording medium in accordance with claim 14, comprising a computer disc.

16. A recording medium in accordance with claim 15, wherein said recording medium comprises an optical, magneto-optical or magnetic disc.

17. A recording medium in accordance with claim 14, comprising electric signals transferred via the Internet.

* * * * *

UNITED STATES PATENT AND TRADEMARK OFFICE
CERTIFICATE OF CORRECTION

PATENT NO. : 7,165,031 B2  Page 1 of 1
APPLICATION NO. : 10/288287
DATED : January 16, 2007
INVENTOR(S) : David Llewellyn Rees It is certified that error appears in the above-identified patent and that said Letters Patent is hereby corrected as shown below:

ON THE TITLE PAGE
At Item (57), Abstract, line 1, "in" should be deleted.

COLUMN 1
Line 56, "in" should read --in,--.
Line 57, "example" should read --example,--.

COLUMN 4
Line 23, "16 bit" should read --16-bit--.
Line 37, "process" should read --processes--.

COLUMN 5
Line 55, "(p(w|x)" should read --(p(w|x))--.

COLUMN 6
Line 3, "constant" should read --constant,--.

COLUMN 8
Line 24, "low" should read --low,--.
Line 30, "noise" should read --noise,--.

Signed and Sealed this

Eighteenth Day of March, 2008

JON W. DUDAS
*Director of the United States Patent and Trademark Office*